Patented July 2, 1929.

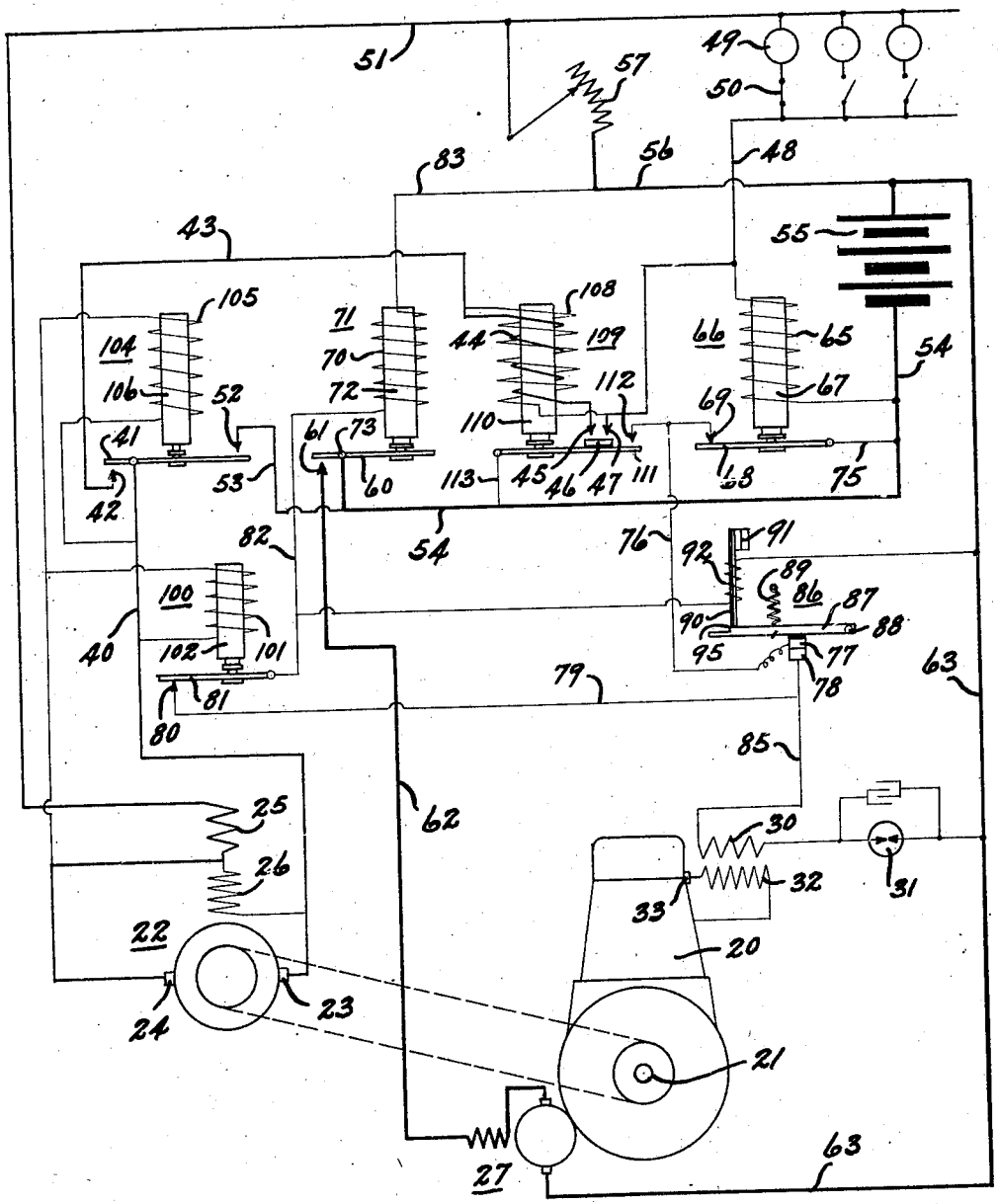

1,719,141

UNITED STATES PATENT OFFICE.

WARREN H. F. SCHMIEDING, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed March 30, 1926. Serial No. 98,627.

The present invention relates to electrical generating systems including a prime mover, such as an internal-combustion engine, a storage battery, and electrical apparatus adapted to be connected with the battery for starting the prime mover and supplying current to a work circuit, and more particularly to generating systems of the type having means for starting from a low voltage battery and for normally supplying current to the work circuit at a higher voltage. A system of the above type is also shown in my application, Serial No. 98,628, filed March 30, 1926.

One of the objects of the present invention is to provide control mechanism for rendering the electrical apparatus operative for supplying current to a work circuit whenever there is a demand for current in the work circuit.

Another object is to provide a novel arrangement of the elements of control mechanism and circuits to perform the foregoing function.

Further objects and advantages of the present invention will be apparent from the following description, reference being had to the accompanying drawing, wherein a preferred form of the present invention is clearly shown.

The figure of the drawing is a wiring diagram illustrating the present invention.

In the drawing, 20 designates a prime mover, herein shown as an internal-combustion engine having a shaft 21 which drives a relatively high-voltage generator 22 having main brushes 23 and 24 connected with the armature of the generator, and having a series field winding 25 and a shunt field winding 26.

The engine is started by a relatively low-voltage series motor 27 which is normally disconnected from the engine, but may be connected automatically with the engine for cranking the latter whenever current is supplied to the motor; and which is automatically disconnected from the engine when the engine becomes self-operative. As various devices for automatically connecting and disconnecting the starting motor are well-known to those skilled in the art, illustration thereof is deemed unnecessary. One form of mechanical connection which may be used with this invention is described and claimed in the copending application of Frank F. Starr, Serial No. 47,717, filed August 3, 1925.

The engine ignition apparatus comprises an ignition coil primary 30, an ignition timer 31 and an ignition coil secondary 32 which is connected with an engine spark plug 33.

A relatively high-voltage work circuit 60 which is supplied by the generator 22, includes a wire 40, contacts 41 and 42, wire 43, magnet coil 44, switch contacts 45, 46 and 47, wire 48, translating devices such as lamps 49 each controlled by switches 50, wire 51 and series field 25.

The battery charging circuit includes wire 40, contacts 41, 42 and 52, wires 53 and 54, a relatively low-voltage storage battery 55, wire 56, a voltage-reducing rheostat 57, to wire 51 on the opposite side of the generator.

The engine cranking circuit includes battery 55, wire 54, contacts 60 and 61, wire 62, motor 27 and wire 63.

To start the engine automatically in response to a demand for current in the work circuit, one of the switches 50 is closed, thereby causing current to flow from the low voltage battery 55 or source of current through the following circuit: Battery 55, wire 54, magnet coil 65, for starting switch 66, wire 48, switch 50, lamp 49, wire 51, rheostat 57, and wire 56. Coil 65 is of a relatively high resistance and, therefore, limits the current flowing from the battery to the lamp 49. It will be noted that the low voltage battery 55 is connected across the high voltage work circuit containing the high voltage translating devices 49, and since such translating devices are of relatively high resistance, the current flowing in the circuit is small. However, such current flowing through winding 65 causes actuation of switch 66 thereby drawing the plunger 67 thereof upwardly to connect a movable contact 68 with the stationary contact 69. When contact 68 engages contact 69, current will flow from the battery through the magnet 70 of starting switch 71, which includes a plunger 72 which, when moved upwardly, will cause contact 60, which is pivoted at 73, to engage contact 61. The circuit between the battery and the magnet 70 is as follows: Battery 55, wires 54 and 75, contacts 68 and 69, wire 76, movable contact 77, contact 78, wire 79, contacts 80 and 81, wire 82, coil 70 and wire 83. The closing of contacts 60 and 61 will establish the cranking circuit previously described. The closing of the contacts 68 and 69 will connect the ignition coil primary 30, the circuit leading via wire 85, from wire 79, thence through primary 30 and timer 31, which in turn is connected with wire 63. Thus, the engine will be started by supplying ignition thereto and cranking the engine by means of the starting motor 27.

If, after connecting the starting motor 27 with the battery for cranking the engine, the latter should not become self-operative within a certain length of time, depletion of the battery is prevented by a cranking cutout 86 which includes contacts 77 and 78. The contact 78 is attached to a lever 87 which is pivoted at 88 and is urged upwardly by a spring 89. Upward movement of the lever 87 is normally restrained by its engagement with the lower end of a bimetallic thermostat blade 90, which is fixed at 91. The blade 90 is in heat-receiving relation to a heating coil 92 which is connected across the battery terminals by connecting one end of the coil 92 with wire 82, and the other end with wire 63. The heating coil 92 of cranking cut-out 86 is thus connected in parallel with the motor 27 during engine cranking, and if the cranking of the engine should continue for an abnormal period, the bi-metallic blade 90 will be heated sufficiently to cause it to bow toward the left, as viewed in the drawing, until the lower end of the blade 90 moves past the shoulder 95 of the lever 87. When this occurs, the lever 87 will move upwardly by spring 89 to separate contact 77 from contact 78, thus interrupting the current to the ignition coil, the heating coil 92 and the magnet coil 70. De-energization of starting switch 71 permits plunger 72 to descend by gravity to move the contact 60 out of engagement with contact 61, thereby opening the starting circuit through motor 27.

Should the engine become self-operative before the cranking cut-out operates, as described, the engine cranking circuit will be interrupted by a stop-cranking relay 100 which includes contacts 80 and 81, magnet winding 101, and a magnetizable plunger 102. The relay magnet winding 101 is normally connected across the terminals of the generator, and when the generator voltage reaches a certain value (less than normal), the magnet coil 101 will be sufficiently energized to attract the plunger 102 to separate contact 81 from contact 80. When this occurs, the circuit between the battery 55 and the winding 70 of the starting switch 71 will be interrupted, thereby permitting the plunger 72 to descend and the contact 60 to be separated from contact 62, thus interrupting the cranking circuit. The separation of contact 81 from contact 80 will interrupt the circuit to the heating coil 92 of cranking cut-out 86.

It is to be understood that when relay 100 operates, the generator 22 is not yet up to full speed and full voltage, but when the generator does attain substantially its full relatively high voltage, load switch 104 will automatically connect the generator with a relay circuit to be described. The switch 104 includes a magnet coil 105 normally connected across the generator terminal in parallel with coil 101, and when the voltage across the terminal attains a certain value, the plunger 106 of load switch 104 will be moved to cause contact 41 to engage contacts 42 and 52.

After contact 41 closed with contact 42, the following relay circuit will be established: Generator 22, wire 40, contacts 41 and 42, coil 108 of a stopping switch 109, wire 48, switch 50, lamp 49, wire 51, series field winding 25, to the opposite side of the generator. Coil 108 comprises a relatively large number of turns of relatively fine wire for the purpose of creating a relatively large number of ampere turns for a relatively low amperage of current flow. The ampere turns created by coil 108 when only one low-wattage lamp is used, is sufficient to attract a plunger 110. The attraction of plunger 110 will cause a contact 111 to be lifted. Contact 111 carries contact 46 which is insulated therefrom, and said contact 111 is also arranged to engage a contact 112 which is connected with wire 76. When contact 111 is moved upwardly by the attraction of the plunger 110, contact 46 will engage contacts 45 and 47 to establish the work circuit through the coil 44 of switch 109, as previously described.

Before contact 41 engages 42, contact 41 will engage contact 52 to complete the battery charging circuit previously described, therefore, as soon as contact 111 engages contact 112 of the stopping switch 109, an auxiliary ignition circuit will be established, which circuit includes generator 22, wire 40, contacts 41 and 52, wires 53 and 54, a wire 113 which is connected with contact 111, contact 112, wire 76, contacts 77 and 78, wire 85, ignition primary 30, timer 31, wires 63 and 56, rheostat 57 and thence to the opposite side of the generator via wire 51.

When contact 46 engages contacts 45 and 47, the low-resistance circuit through coil 44 will cause coil 108 of stopping switch 109, and coil 65 of starting switch relay 66, to be short-circuited. When this occurs, contacts 45, 46 and 47, and contacts 111 and 112 will be held in engagement with their respective cooperating contacts, merely by the coil 44. Since coil 65 is short circuited, its cooperating plunger 67 will fall by gravity, whereby contact 68 will be separated from contact 69 and the ignition circuit will be controlled solely through contacts 111 and 112.

Since coil 44 is in series with the work circuit, the switching off of all the translating devices in said work circuit stops the current flow through the coil 47. When this occurs, the plunger 110 will fall by gravity, causing contact 46 to separate from contacts 45 and 47, and will cause contact 111 to separate from contact 112. The separation of contact 111 from contact 112 will break the ignition circuit to the engine, whereby the generating operation will cease.

Thus, it is apparent that a system has been provided in which a prime mover control device, such as an ignition system for an internal-combustion engine, is rendered operable by one relay, and is maintained operable and stopped by a second relay or switch. This latter switch is constructed and arranged so that it will operate when only a relatively small amperage of current is flowing therethrough. Therefore, the switch can be made relatively small, since the arrangement is such that the switch is closed by the fine winding coil, and only such number of coarse wire turns need be provided as are necessary for maintaining said switch closed, and, since only a few coarse wire turns are necessary the switch may be made relatively small.

While the form of embodiment of the present invention as herein disclosed, constitutes a preferred form, it is to be understood that other forms might be adopted, all coming within the scope of the claims which follow.

What is claimed is as follows:

1. An electrical generating system comprising, in combination, a prime mover; a storage battery; a work circuit; electrical apparatus connected with the prime mover and battery for starting the prime mover and for thereafter supplying current to the work circuit; a prime mover control device; a controller for rendering said device operative; and switch apparatus including a coil of fine wire and relatively large number of turns, a circuit for said coil adapted to be controlled subsequently to the operation of said controller, means rendered operable by said coil for rendering said device operative independently of said controller, and means operated subsequently to the operation of said first means for maintaining said first means operative as long as there is a demand for current in said work circuit and for rendering said controller ineffective.

2. An electrical generating system comprising in combination, a prime mover; a storage battery; a work circuit; electrical apparatus connected with the prime mover and battery for starting the prime mover and for thereafter supplying current to the work circuit; a prime mover control device; a controller for rendering said device operative and switch apparatus including a coil of fine wire and relatively large number of turns, a circuit for said coil adapted to be controlled subsequently to the operation of said controller, means rendered operable by said coil for rendering said device operative independently of said controller, and a circuit for connecting the electrical apparatus with the work circuit and adapted to be energized subsequently to said coil and adapted when energized to render said controller ineffective, said last circuit including a low resistance coil for maintaining said means operative as long as there is a demand in the work circuit.

3. An electrical generating system comprising, in combination, a prime mover; a storage battery; a work circuit; electrical apparatus connected with the prime mover and battery for starting the prime mover and for thereafter supplying current to the work circuit; a prime mover control device; a controller for rendering said device operable; and switch apparatus including a coil of fine wire and relatively large number of turns, a circuit connecting said coil in series relation with the work circuit and adapted to be controlled subsequently to said controller, means rendered operable by said coil for rendering said device operative independently of said controller, and a low-resistance coil adapted to be energized subsequently to said first coil, said low-resistance coil being arranged in series relation with the work circuit and adapted when energized to render said first coil and controller ineffective and to maintain said means operative as long as there is a demand in the work circuit.

4. An electrical generating system comprising, in combination, a prime mover; a storage battery; a work circuit; electrical apparatus connected with the prime mover and battery for starting the prime mover and for thereafter supplying current to the work circuit; a prime mover control device; a controller for rendering said device operable; and switch apparatus including a coil of fine wire and relatively large number of turns, a circuit connecting said coil in series relation with the work circuit and adapted to be controlled subsequently to said controller, means rendered operable by said coil for rendering said device operative independently of said controller, and a low-resistance coil controlled by the first coil and arranged in series relation with the work circuit and adapted when energized to render said first coil and controller ineffective and to maintain said means operable as long as there is a demand in the work circuit.

5. An electrical generating system comprising, in combination, a work circuit, a prime mover including prime-mover-supply means associated therewith, plural control means for said supply means, electrical generating means adapted to be driven by the prime mover, means responsive to a demand in the work circuit for conditioning one of said control means for prime-mover operation and for bringing said prime mover to a state of self-actuation whereby to cause the generating means to supply current to the work circuit, means responsive to the generating means for rendering another of said control means operative, and another means responsive to the generating means for maintaining the second named control means operative and for rendering the first named control means inoperative and responding to the discontinuance of demand by the work circuit for disabling the remaining operative control means whereby to stop said prime mover.

6. An electrical generating system comprising, in combination a work circuit, an internal combustion engine and an ignition device therefor; a plurality of circuits for said device, electrical generating means adapted to be driven by the prime mover, means responsive to a demand in the work circuit for rendering one of said ignition circuits operative and for bringing said prime mover to a state of self-actuation whereby to cause the generating means to supply current to the work circuit, means responsive to the generating means for rendering another of said ignition circuits operative, and another means responsive to the generating means for maintaining the second named ignition circuit operative and for rendering the first named ignition circuit inoperative and responding to the discontinuance of demand by the work circuit for disabling the remaining ignition circuit whereby to stop said engine.

In testimony whereof I hereto affix my signature.

WARREN H. F. SCHMIEDING.